(12) United States Patent
Nishioka (10) Patent No.: US 7,800,843 B2
(45) Date of Patent: Sep. 21, 2010

(54) LENS SYSTEM AND OPTICAL APPARATUS

(75) Inventor: Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 337 days.

(21) Appl. No.: 11/703,413

(22) Filed: Feb. 6, 2007

(65) Prior Publication Data

US 2007/0201149 A1  Aug. 30, 2007

(30) Foreign Application Priority Data

Feb. 24, 2006  (JP) .............................. 2006-048814

(51) Int. Cl.
*G02B 9/04* (2006.01)
(52) U.S. Cl. ...................................... 359/793
(58) Field of Classification Search ............... 359/793, 359/717, 691, 642
See application file for complete search history.

(56) References Cited

U.S. PATENT DOCUMENTS

| | | | | |
|---|---|---|---|---|
| 5,623,370 | A * | 4/1997 | Ueda et al. .................. | 359/654 |
| 6,788,273 | B1 * | 9/2004 | Schultz et al. .............. | 343/909 |
| 2002/0175693 | A1 | 11/2002 | Starr et al. | |
| 2003/0227415 | A1 | 12/2003 | Joannopoulos et al. | |
| 2006/0006485 | A1 * | 1/2006 | Mouli ........................ | 257/432 |

OTHER PUBLICATIONS

A mechanism of optical system and its application, 73-77, 167-170 with English translation.
J. B. Pendry, Physical Review Letters 85, 3966-3969 (2000).
M. Notomi, Physical Review B 62, 10696-10705 (2000).
V. G. Veselago et al., Soviet Physics USPEKHI 10, 509-514 (1968).
Liu Lin and Sailing He, Optics Express, vol. 12, No. 20, 4835-4840 (2004).
T. Sato and S. Kawakami, Optronics No. 7, 197-202 (2001) with English abstract.
D. Schurig et al., Physical Review E 70, 065601 (2004).

* cited by examiner

*Primary Examiner*—Alicia M Harrington
(74) *Attorney, Agent, or Firm*—Kenyon & Kenyon LLP

(57) ABSTRACT

A lens system includes a first lens which is formed of a medium exhibiting negative refraction and a second lens which is formed of a medium having a positive refractive index. Abbe's number for a material which forms the first lens differs from Abbe's number for a material which forms the second lens. Moreover, a lens system includes a first lens which is formed of a medium exhibiting negative refraction and a second lens which is formed of a medium exhibiting negative refraction. Abbe's number for a material which forms the first lens differs from Abbe's number for a material which forms the second lens.

17 Claims, 10 Drawing Sheets

LENS SYSTEM AND OPTICAL APPARATUS

CROSS-REFERENCE TO RELATED APPLICATION

The present application is based upon and claims the benefit of priority from the prior Japanese Patent Application No. 2006-48814 filed on Feb. 24, 2006; the entire content of which are incorporated herein by reference.

BACKGROUND OF THE INVENTION

1. Field of the Invention

The present invention relates to a lens system.

2. Description of the Related Art

Optical systems such as an optical device, an imaging optical system, an observing optical system, a projection optical system, and a signal processing system, in which light or electromagnetic waves are used, and an optical apparatuses in which such optical systems are used have hitherto been known. These optical systems have a drawback that a resolution is limited due to a diffraction which occurs due to a wave nature of light or electromagnetic waves.

Therefore, as a technology for realizing an image formation beyond this diffraction limit, using a negative refractive index medium has been mentioned in Literature, "Physical Review Letters, Volume 85, Pages 3966 to 3969, 18 (2000)" by J. B. Pendry, and Literature "Optics Express, Volume 12, No. 20, Pages 4835 to 4840 (2004)" by L. Liu and S. He.

Figure 9:
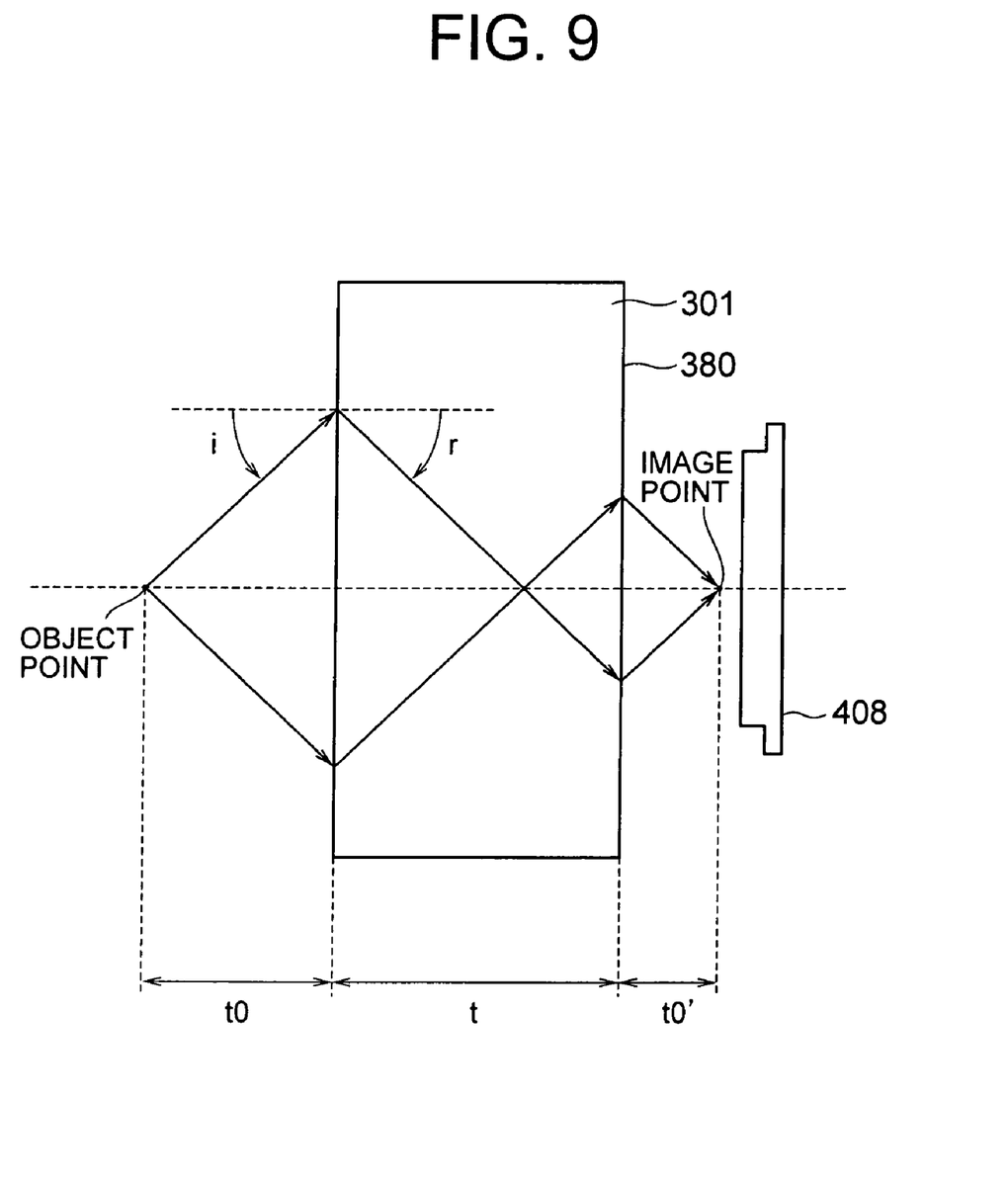
FIG. 9 is a diagram for describing an image formation by a plane-parallel plate 380 which is formed of a negative refractive index medium 301.

FIG. 9 is a diagram which describes this technology, in which an image formation by a plane-parallel plate (flat plate) 380 formed of a negative refractive index medium 301, is shown. In FIG. 9 t0 . . . a distance between an object point and a left-side surface of the flat plate 380 t0' . . . a distance between the image point and a right-side surface of the flat plate 380 t . . . a thickness of the flat plate 380 i . . . an angle of incidence r . . . an angle of refraction ns . . . a refractive index of the negative refractive index medium with respect to vacuum.

A refractive index of a medium around the flat plate 380 with respect to the vacuum is n0, and in a case of the vacuum, n0=1. FIG. 9 shows a case when n0=1, and ns=−1.

An arrow shows propagating light emitted by an object. According to the Literature "Physical Review Letters, Volume 85, Pages 3966 to 3969, 18 (2000)" by J. B. Pendry, since the law of refraction holds true, $$n0 \sin i = ns \sin r \qquad \text{expression 101}$$

and when n0=1 and ns=−1, then $$r = -i \qquad \text{expression 102}$$

Consequently, the propagating light is focused to an image point where the following expression 103 is satisfied.

$$t0 + t0' = t \qquad \text{expression 103}$$

On the other hand, evanescent waves emitted by the object point are restored at a point, where t0' satisfies the expression 103 and have the same intensity as the intensity at the object point. Since the entire light emitted by the object is focused at the image point, an image formation beyond the diffraction limit is realized. This is called as perfect imaging. It has hitherto been known from the Literature "Physical Review Letters, Volume 85, Pages 3966 to 3969, 18 (2000)" by J. B. Pendry, that the perfect imaging is realized when expression 103 and the following expression 104 hold true, even when an area around the negative refractive index medium 301 is not a vacuum.

$$ns = -n0 \qquad \text{expression 104}$$

In this patent application, a term 'light' also includes electromagnetic waves such as microwaves and terahertz waves. Further, in FIG. 9, imaging device 408 is provided.

Figure 10:
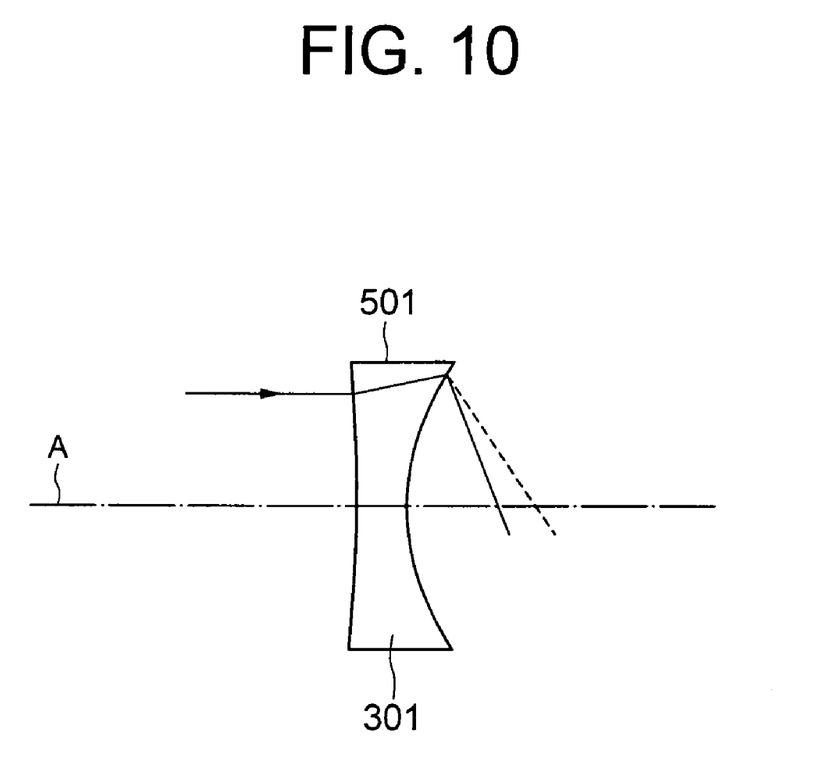
FIG. 10 is a diagram for describing a chromatic aberration.

On the other hand, as it is described in Literature "Soviet Physics USPEKHI, Volume 10, Pages 509 to 514, (1968)" by V. G. Veselago, a negative refractive index medium has a chromatic dispersion (chromatic aberration). There is an occurrence of chromatic aberration when a lens 501 having a curved surface as shown in FIG. 10 is made of the negative refractive index medium 301. A continuous line indicates a d-line (beam of orange color) and a dotted line indicates a g-line (beam of bluish purple color). Moreover, A indicates an optical axis.

SUMMARY OF THE INVENTION

The present invention provides a lens system in which a negative refractive index medium, in which a chromatic aberration is reduced, is used.

In one aspect of the present invention, there can be provided a lens system which includes a first lens formed of a medium exhibiting negative refraction, and a second lens, and a sign (+ or −) of Abbe's number for a material which forms the first lens differs from a sign (+ or −) of Abbe's number for a material which forms the second lens.

The second lens can be formed of a material having a positive refractive index.

Further the second lens can be formed of a medium exhibiting negative refraction. In another aspect of the present invention, it is possible to provide a lens system which includes a first lens which is formed of a medium exhibiting negative refraction, and a second lens, and a sign of Abbe's number for a material which forms the first lens is same as a sign of Abbe's number for a material which forms the second lens.

The second lens can be formed of a material having a positive refractive index.

Furthermore, the second lens can be formed of a material exhibiting negative refraction. A sign of Abbe's number for a material which forms the first lens is same as a sign of Abbe's number for a material which forms the second lens.

DETAILED DESCRIPTION OF THE INVENTION

Embodiments of a lens system according to the present invention will be described below in detail based on the accompanying diagrams. However, the present invention is not restricted to the embodiments which will be described below.

First Embodiment

Figure 1:
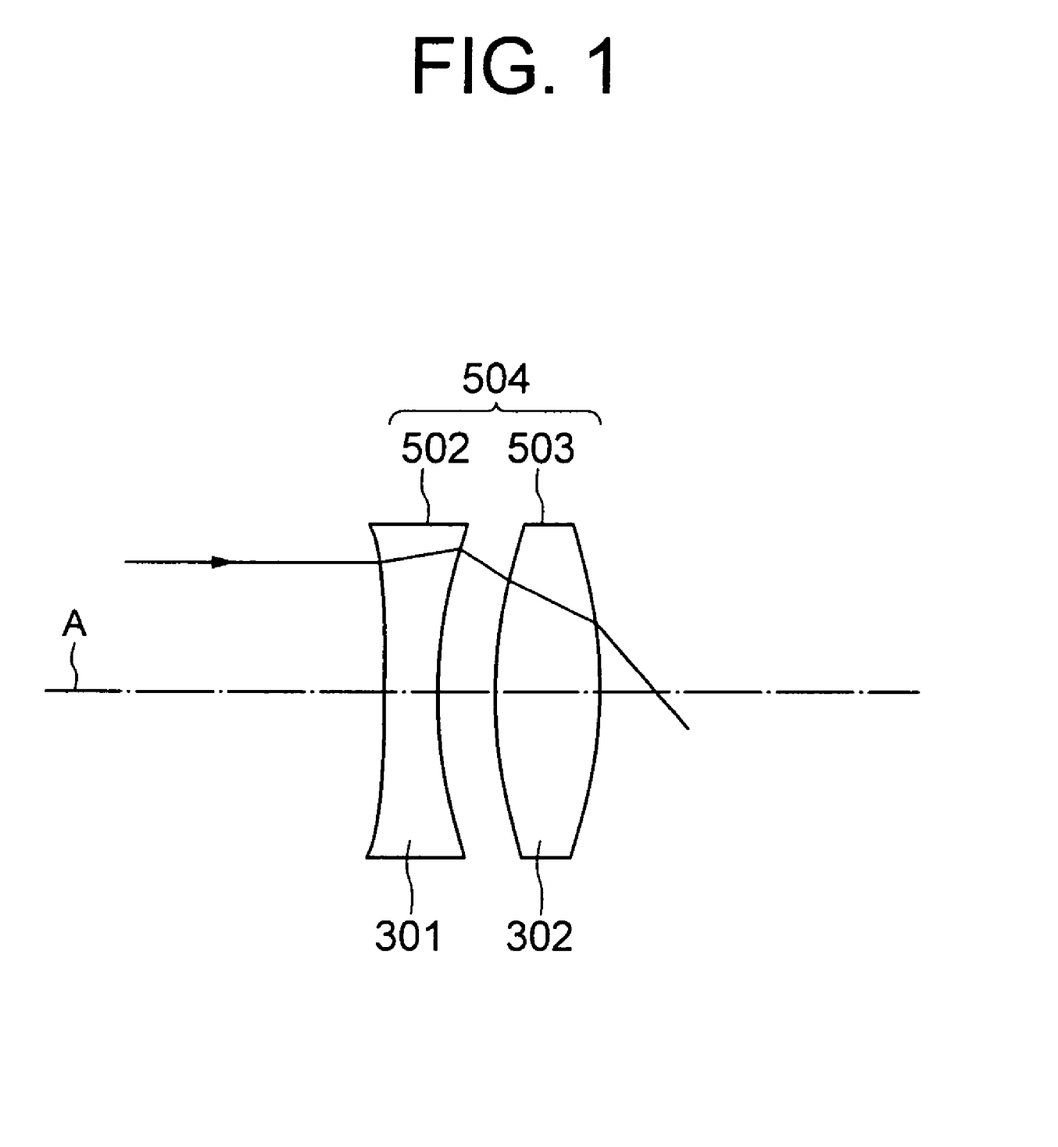
FIG. 1 is a diagram showing a structure of a lens system according to a first embodiment of the present invention.

A first embodiment of the present invention will be described below. FIG. 1 shows a lens system 504 which is an example of the present invention, in which a lens 502 having a concave surface on both sides, which is made of a negative refractive index medium 301, and a lens 503 having a convex surface on both sides, which is made of a positive refractive index medium 302 are combined (first embodiment).

When a relative refractive index of the lens 301 with respect to a medium in the surrounding thereof is let to be n'1, and when a relative refractive index of the lens 302 with respect to a medium in the surrounding thereof is let to be n'2, then $$n'1<0 \qquad \text{expression 105}$$

$$n'2>0 \qquad \text{expression 106}$$

Therefore, the lens 502 acts as a lens having a light converging effect (in other words, lens having a positive focal length), and the lens 503 acts as a lens having the light converging effect (in other words, lens having the positive focal length).

A focal length of the lens 502 is let to be f1, and a focal length of the lens 503 is let to be f2. Moreover, Abbe's number for the negative refractive index medium 301 is let to be ν1, and Abbe's number for the positive refractive index medium 302 is let to be ν2.

Figure 2:
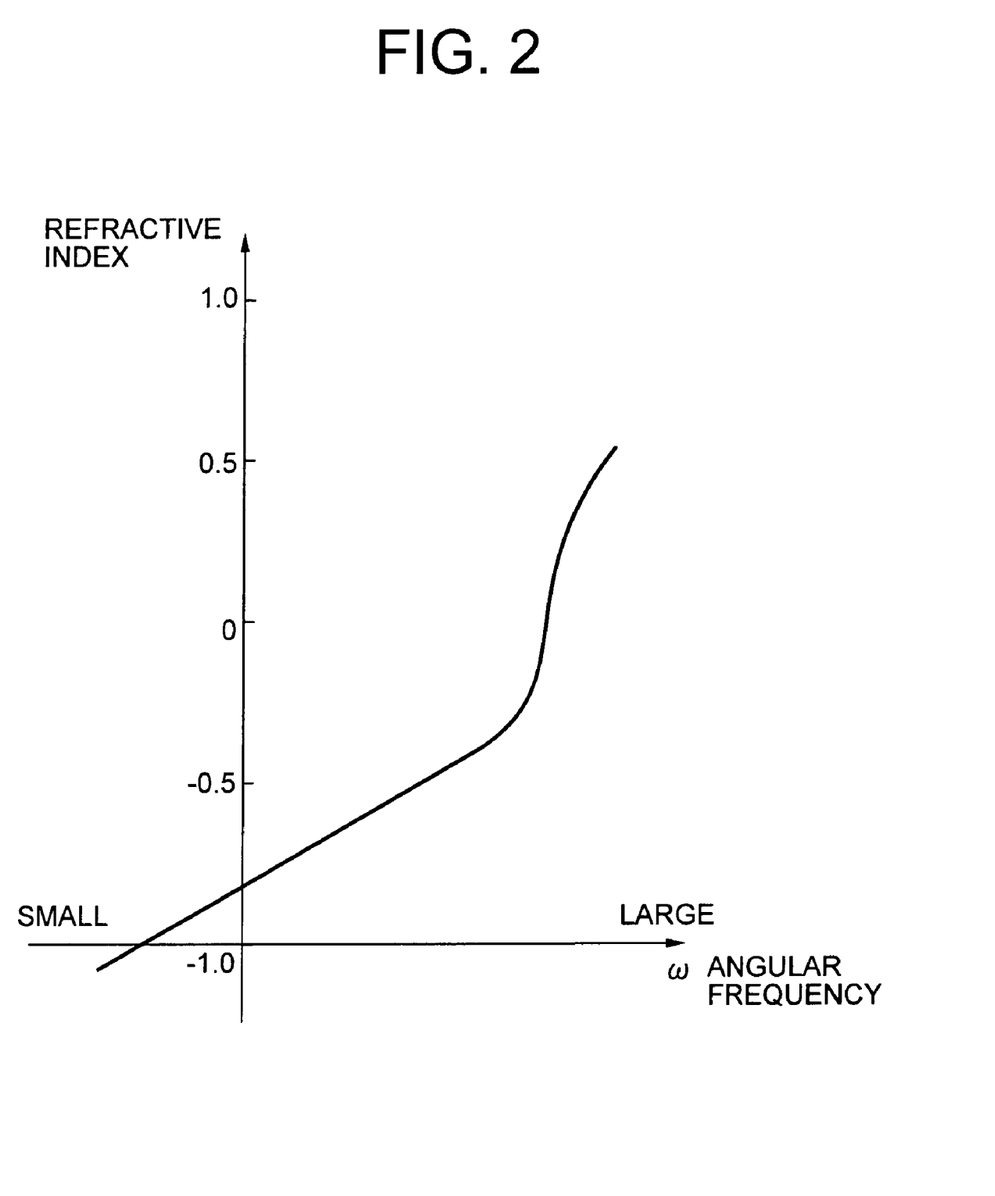
FIG. 2 is a diagram showing a relationship between an angular frequency and a refractive index.

According to Literature "Physical Review B, Volume 62, Page 10696 (2000)" by M. Notomi, the refractive index as a function of the angular frequency ω of light in a photonic crystal which is a typical negative refractive index material, is as shown in FIG. 2. The angular frequency is a frequency of light multiplied by 2π.

Consequently, when a medium in FIG. 2 is used for the lens 502, in an area of a negative refractive index the following expression 107 holds true.

$$\nu1<0 \qquad \text{expression 107}$$

When general optical materials such as glass and plastic are considered as the positive refractive index medium 302, then $$\nu2>0 \qquad \text{expression 108}$$

A requirement for eliminating the chromatic aberration when two thin lenses are arranged to be closer is as shown by the following expression 109.

$$1/(f1\cdot\nu1)+1/(f2\cdot\nu2)=0 \qquad \text{expression 109}$$

Here, since $$f1>0 \qquad \text{expression 110 and}$$

$$f2>0 \qquad \text{expression 111,}$$

expression 107 and expression 108 hold true. Therefore, it is possible to satisfy expression 109 when f1, f2, ν1, and ν2 are selected appropriately.

Furthermore, since the focal length is positive for both the lenses 502 and 503, it is possible to have a lens which has a strong positive power.

In a system which includes two lenses, one negative lens and one positive lens, in which a normal positive refractive index medium is used, Abbe's number for both the lenses being positive, when the chromatic aberration is eliminated, the focal length of each lens takes an opposite sign. Therefore, it was difficult to achieve a strong power. However, such difficulty is not there in the lens system of the present invention.

When f1>0, at least one surface of the lens 502 may be a concave surface. When f2>0, at least one surface of the lens 503 may be a convex surface.

Figure 3:
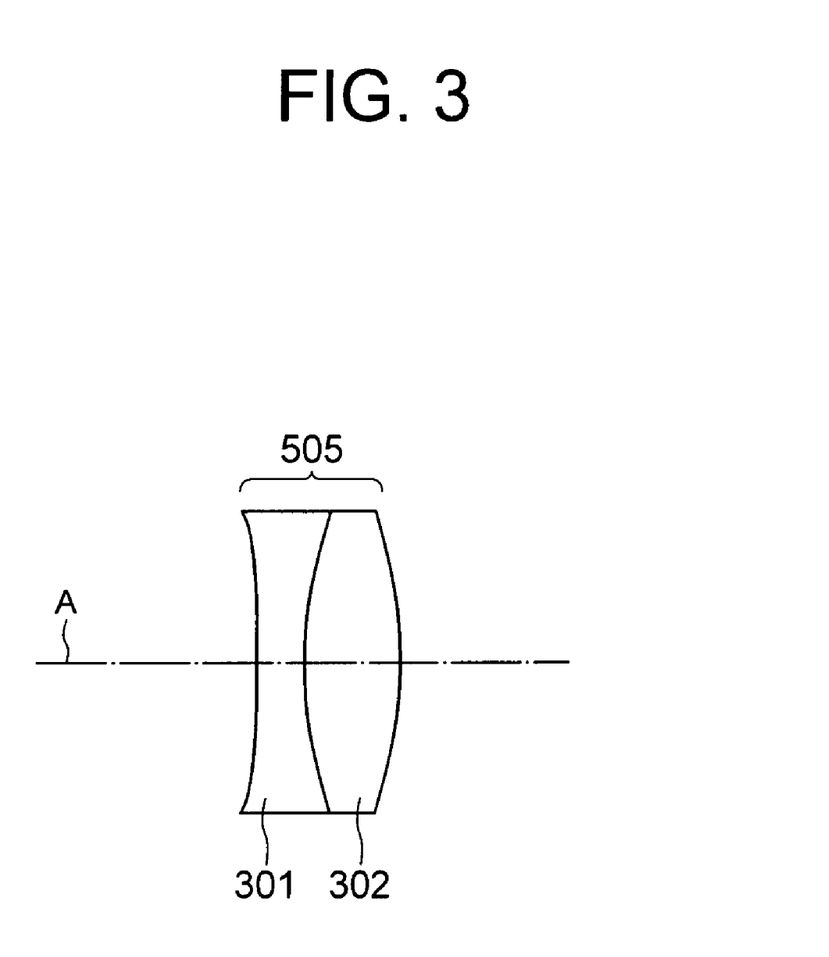
FIG. 3 is a diagram showing a structure of a lens system according to a modified embodiment.

The lens 502 and the lens 503 in the lens system in FIG. 1 may be cemented as shown in FIG. 3, and let to be one lens 505. Moreover, an order of the lens 502 and the lens 503 on an optical axis A may be reversed.

Second Embodiment

Figure 4:
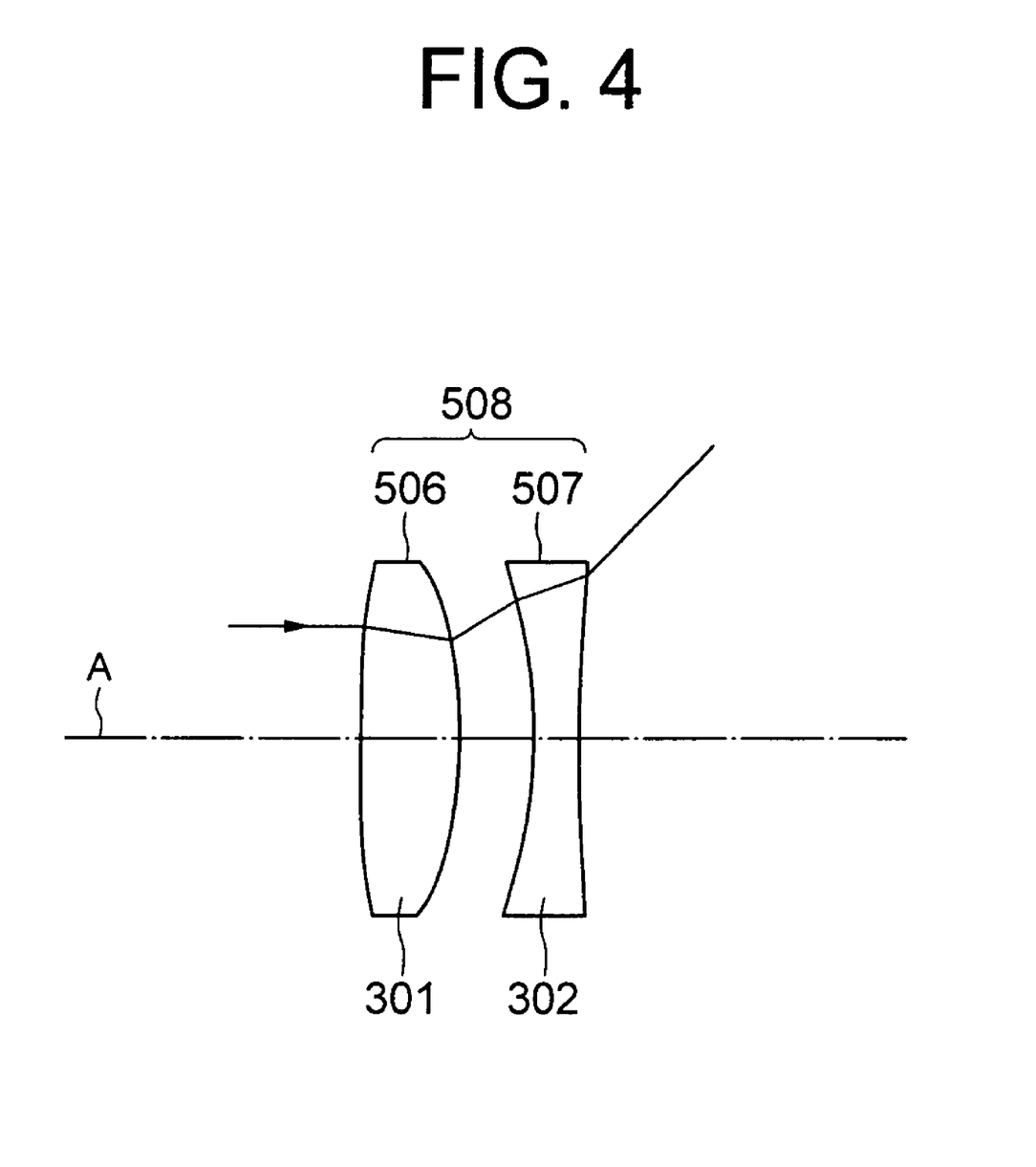
FIG. 4 is a diagram showing a structure of a lens system according to a second embodiment.

Next, a lens system according to a second embodiment of the present invention will be described below. A lens system 508 which includes two lenses 506 and 507 as shown in FIG. 4 will be taken into consideration.

The lens 506 is formed of the negative refractive index medium 301, and a focal length of which is let to be f3. The lens 507 is formed of positive refractive index medium 302, and a focal length of which is let to be f4. Further f3 and f4 are let to be as in the following expression 112 and expression 113 respectively.

$$f3<0 \qquad \text{expression 112}$$

$$f4<0 \qquad \text{expression 113}$$

Consequently, at least a surface on one side of the lens 506 is a convex surface and at least a surface on one side of the lens 507 is a convex surface. Expression 107 is let to be held true for the lens 506. Expression 108 holds true for the lens 507.

Therefore, when f1 is replaced by f3 and f2 is replaced by f4 in expression 109, and when f3, f4, ν1, and ν2 are selected appropriately, it is possible to let expression 109 to be held true.

Consequently, it is possible to achieve a lens system having a strong negative power and no chromatic aberration. In FIG. 4, the lens 506 and the lens 507 may be cemented by an adhesive. An order of the lens 506 and the lens 507 on the optical axis A may be reversed. Practically, it is not necessary that expression 109 holds true strictly.

In many cases, the following expression 114 may be satisfied.

$$-|1/(10fT)|\leq 1/(f1\cdot\nu1)+1/(f2\cdot\nu2)\leq |1/(10fT)| \qquad \text{expression 114}$$

When a wavelength band of light used is narrow, the following expression 15 may be satisfied.

$$-|1/(fT)|\leq 1/(f1\cdot\nu1)+1/(f2\cdot\nu2)\leq |1/(fT)| \qquad \text{expression 115}$$

Furthermore, according to an application in which the chromatic aberration is not of much importance, the following expression 116 may be satisfied.

$$-|10/(fT)|\leq 1/(f1\cdot\nu1)+1/(f2\cdot\nu2)\leq |10/(fT)| \qquad \text{expression 116}$$

Here, fT is a focal length of the entire lens system 504.

In expression 114, expression 115, and expression 116, when the focal lengths f1 and f2 are replaced by the focal lengths f3 and f4 respectively, the expressions hold true even for a system in FIG. 4. In this case, fT is a focal length of the entire lens system 508.

Examples of combinations of the negative refractive index lens and the positive refractive index lens which are capable of reducing the chromatic aberration are shown in table 1.

TABLE 1

Combinations of the negative refractive index lens and the positive refractive index lens capable of reducing the chromatic aberration

| | Combination | | | | | | | |
|---|---|---|---|---|---|---|---|---|
| | 1 | 2 | 3 | 4 | 5 | 6 | 7 | 8 |
| Abbe's number for negative refractive index lens | − | − | + | + | − | − | + | + |
| Focal length of negative refractive index lens | + | − | + | − | + | − | + | − |
| Abbe's number for positive refractive index lens to be combined | + | + | + | + | − | − | − | − |
| Focal length of positive refractive index lens to be combined | + | − | − | + | − | + | + | − |
| Focal length of entire system | + | − | Ind | Ind | Ind | Ind | + | − |
| Effect of enhancing absolute value of power | Sub | Sub | Sm | Sm | Sm | Sm | Sub | Sub |
| Embodiment | 1 | 2 | | | | | | | where "Ind" denotes indefinite, "Sub" denotes substantial, and "Sm" denotes small.

Combination 1 corresponds to the first embodiment and combination 2 corresponds to the second embodiment. Also, combinations 7 and 8 are advantageous, as an absolute value of power when the two lenses are combined is increased.

In combinations 3, 4, 5, and 6, since the focal length of the two lenses have opposite signs, although an effect of an increase in the absolute value of power is small, it is possible to reduce the chromatic aberration.

Figure 5:
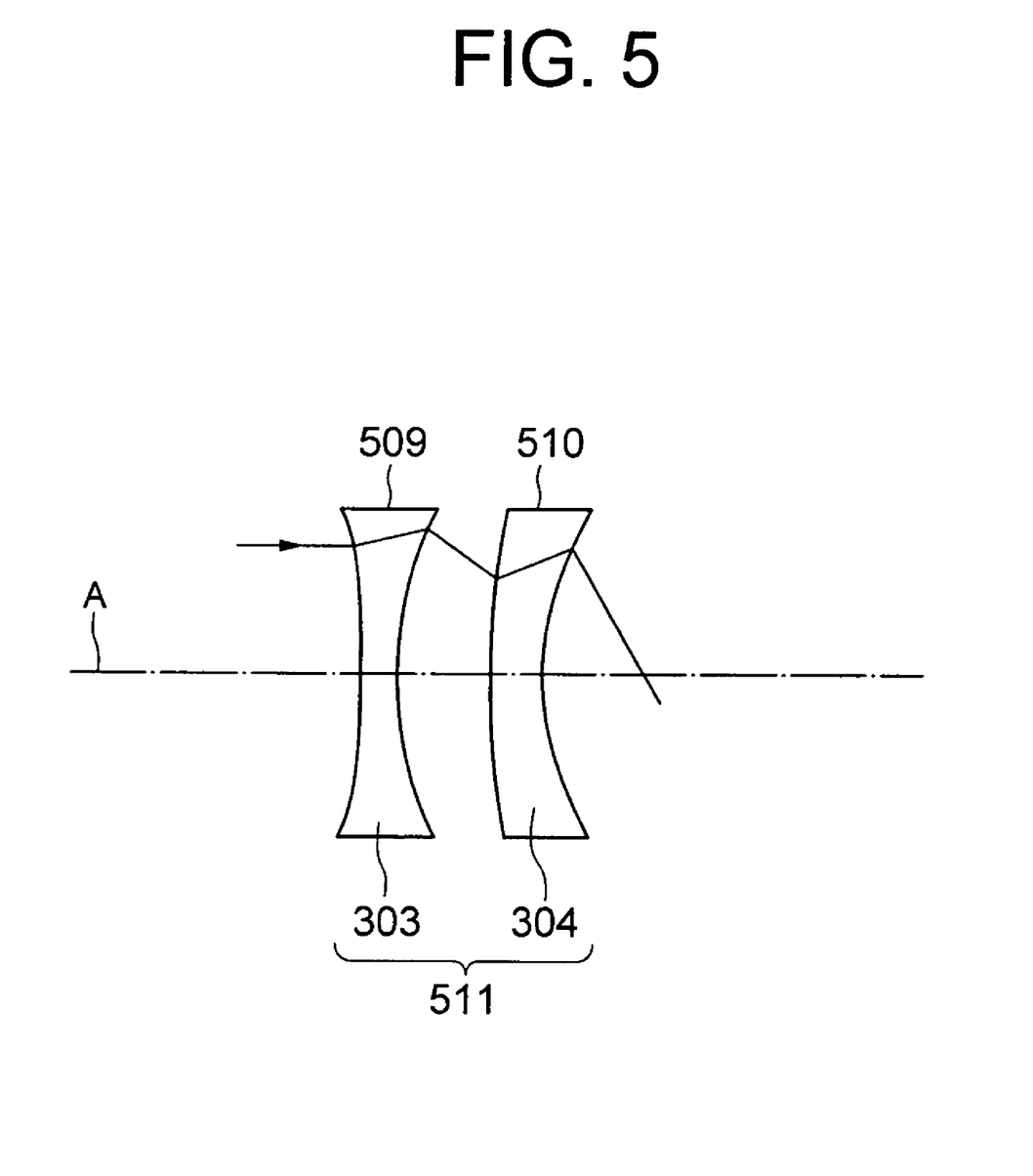
FIG. 5 is a diagram showing a structure of a lens system according to a third embodiment of the present invention.

Next, a lens system according to a third embodiment of the present invention will be described below. FIG. 5 shows a lens system 511 according to the third embodiment in which, two lenses 509 and 510 having positive focal lengths f5 and f6, which are formed of negative refractive index media 303 and 304, are combined.

Abbe's number ν5 for the negative refractive index medium 303 is negative.

$$\nu 5 < 0 \qquad \text{expression 117}$$

Abbe's number ν6 for the negative refractive index medium 304 is positive.

$$\nu 6 > 0 \qquad \text{expression 118}$$

By selecting appropriately f5, f6, ν5, and ν6, it is possible to satisfy the following expression 119.

$$1/(f5 \cdot \nu 5) + 1/(f6 \cdot \nu 6) = 0 \qquad \text{expression 119}$$

Consequently, a correction of the chromatic aberration becomes possible. Further, since both the lenses 509 and 510 have positive focal length, the lens system 511 becomes a lens having a strong positive power.

Expression 114, expression 115, and expression 116 hold true even for the system in FIG. 5 when f1 and f2 are replaced by f5 and f6, and ν1 and ν2 are replaced by ν5 and ν6. In this case, fT is a focal length of the entire lens system 511. An order of the lens 509 and the lens 510 on the optical axis A may be reversed.

Combinations of two negative refractive index lenses which are capable of reducing the chromatic aberration are shown in table 2.

TABLE 2

Combinations of the negative refractive index lens and the negative refractive index lens capable of reducing the chromatic aberration

| | Combination | | | | | | | |
|---|---|---|---|---|---|---|---|---|
| | 9 | 10 | 11 | 12 | 13 | 14 | 15 | 16 |
| Abbe's number for negative refractive index lens | − | − | + | + | − | − | + | + |
| Focal length of negative refractive index lens | + | − | + | − | + | − | + | − |
| Abbe's number for negative refractive index lens to be combined | + | + | + | + | − | − | − | − |
| Focal length of negative refractive index lens to be combined | + | − | − | + | − | + | + | − |
| Focal length of entire system | + | − | Ind | Ind | Ind | Ind | + | − |
| Effect of enhancing absolute value of power | Sub | Sub | Sm | Sm | Sm | Sm | Sub | Sub |
| Embodiment | 3 | | | | | | | | where "Ind" denotes indefinite, "Sub" denotes substantial, and "Sm" denotes small.

Combination 9 corresponds to the third embodiment. Also, combinations 10, 15, and 16 are advantageous, as an absolute value of power when the two lenses are combined, is increased. In combinations 11, 12, 13, and 14, since the focal length of the two lenses have opposite signs, although an effect of an increase in the absolute value of power is small, it is possible to reduce the chromatic aberration.

A comment which can be made commonly for table 1 and table 2 is that when Abbe's number for the two lenses have opposite signs, when the chromatic aberration is eliminated, it is possible to have an effect of enhancing the absolute value of the power of the lens system. Moreover, an order of the two lenses on the optical axis A may be reversed.

Figure 6:
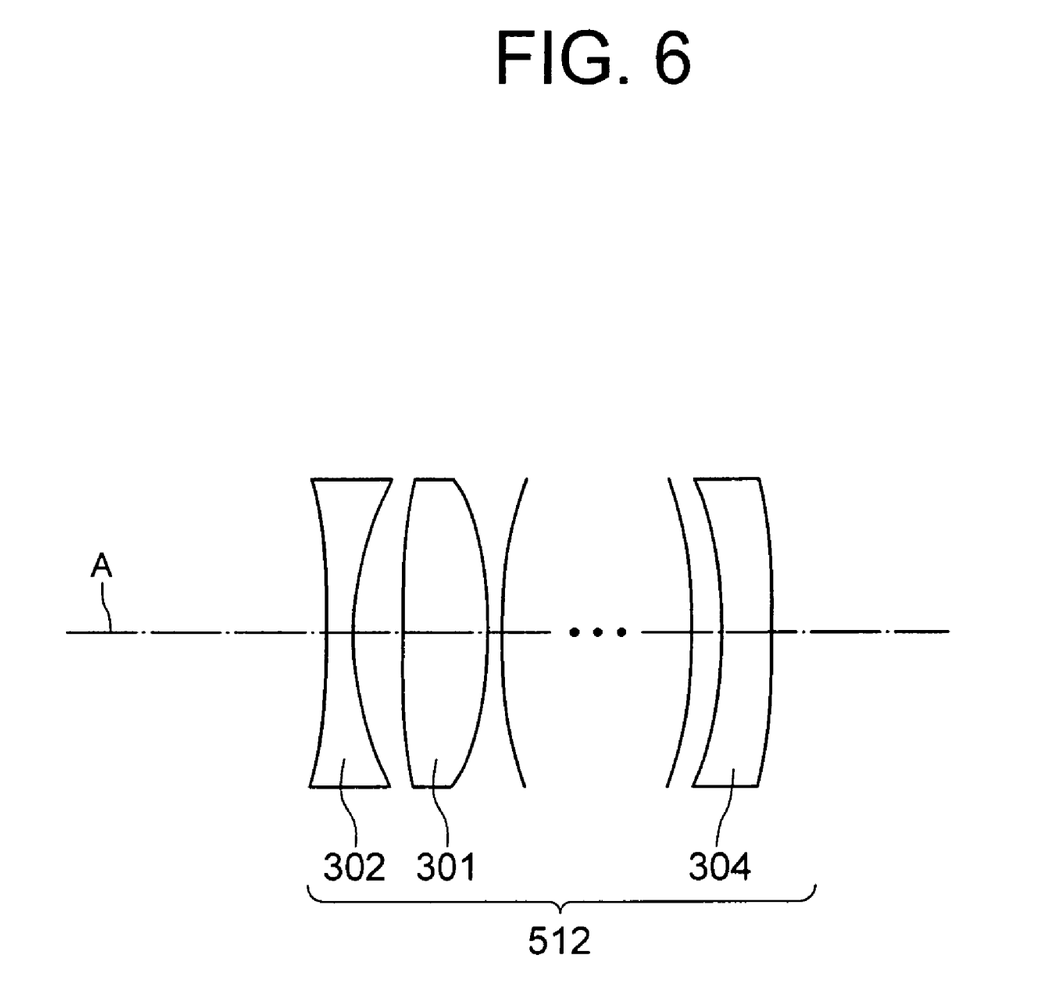
FIG. 6 is a diagram showing a structure of a lens system according to another modified embodiment.

FIG. 6 is a diagram showing a lens system 512 in which three or more lenses are combined. The lens system 512 includes at least one lens made of negative refractive index medium. Moreover, combinations of lenses corresponding to the combinations in any one of table 1 and table 2 are included in the lens system 512. Consequently, the chromatic aberration reduction effect is achieved.

Moreover, when Abbe's number for these two lenses have opposite signs, it is possible to have an effect of enhancing the absolute value of the power of the lens system when the chromatic aberration is eliminated.

In a case of an example in FIG. 6, when a focal length of an i'th lens is let to be fi, Abbe's number for the i'th lens is let to be νi, a focal length of the entire lens system 512 is let to be fTN, and the number of lenses is let to be N, then when $$\sum_{i=1}^{N} \frac{1}{fi \cdot \nu i} = 0 \qquad \text{expression 120}$$

it is possible to eliminate the chromatic aberration. Here, the lens system is approximated by a system in which thin lenses are placed in contact.

$$-\left|\frac{1}{10 f_{TN}}\right| \leq \sum_{i=1}^{N} \frac{1}{fi \cdot vi} \leq \left|\frac{1}{10 f_{TN}}\right| \qquad \text{expression 121}$$

Practically, in many cases, expression 121 may be satisfied. In a case such as when the wavelength band of light used is narrow, the following expression 122 may be satisfied.

$$-\left|\frac{1}{f_{TN}}\right| \leq \sum_{i=1}^{N} \frac{1}{fi \cdot vi} \leq \left|\frac{1}{f_{TN}}\right| \qquad \text{expression 122}$$

According to an application in which the chromatic aberration is not much important, the following expression 123 may be satisfied.

$$-\left|\frac{10}{f_{TN}}\right| \leq \sum_{i=1}^{N} \frac{1}{fi \cdot vi} \leq \left|\frac{10}{f_{TN}}\right| \qquad \text{expression 123}$$

Expression 120, expression 121, expression 122, and expression 123 hold true even when N is 2. Consequently, expression 120, expression 121, expression 122, and expression 123 hold true for natural number N where $N \geq 2$.

Here, Abbe's number $v$ which is used in this patent application will be described in detail. When a wavelength of the light used is in a visible light region (wavelength range from 380 nm to 700 nm), Abbe's number $v$ is defined by the following expression 125.

$$v = (n'd - 1)/(n'F - n'C) \qquad \text{expression 125}$$

where, n'd is a relative refractive index of a lens to a medium around the lens for light of wavelength 587.6 nm, n'F is a relative refractive index of the lens to the medium around the lens for light of wavelength 486.1 nm, and n'C is a relative refractive index of the lens to the medium around the lens for light of wavelength 656.3 nm. Here, a value of the relative refractive index of the lens to the medium around the lens may be either positive or negative.

On the other hand, when a wavelength region of the light used is other than a wavelength region of the visible light, n'd may be replaced by a relative refractive index of a lens to a medium around a lens at a center of that wavelength region, n'F may be replaced by a relative refractive index of a lens to a medium around a lens at the shortest wavelength in that wavelength region, and n'C may be replaced by a relative refractive index of a lens to a medium around a lens at the longest wavelength in that wavelength region.

In this patent application, the focal length is let to indicate a focal length of a lens in the medium around the lens.

It is desirable that a refractive index ns of the negative refractive index medium 301 for vacuum satisfies the following expression 141.

$$-5 \leq ns \leq -0.3 \qquad \text{expression 141}$$

When ns exceed an upper limit in expression 141, an absolute value of Petzval sum for a single lens is increased and a correction of curvature of field as a lens system, becomes difficult. When ns is less than a lower limit in expression 141, making the negative refractive index medium becomes difficult, and a cost becomes high.

Practically, in some cases the following expression 142 may be satisfied.

$$-10 \leq ns \leq -0.1 \qquad \text{expression 142}$$

When the following expression 143 is satisfied, it is more preferable.

$$-3 \leq ns \leq -0.5 \qquad \text{expression 143}$$

A value of $v$ of the negative refractive index medium will be described below.

It is desirable that the following expression 145 is satisfied.

$$1 \leq |v| \leq 200 \qquad \text{expression 145}$$

When the value of $v$ surpasses an upper limit, it is difficult to have an effect of aberration correction, and when the value of $v$ is less than a lower limit, the chromatic aberration tends to be influenced by a manufacturing error of an optical material.

Practically, sometimes the following expression 146 is also acceptable.

$$0.1 \leq |v| \leq 1000 \qquad \text{expression 146}$$

In an application in which the chromatic aberration is not really a problem, the following expression 147 may be satisfied.

$$0.01 \leq |v| \leq 10000 \qquad \text{expression 147}$$

A numerical example of the embodiment in FIG. 1 will be described below.

$v1 = -10$ $f1 = 50\ \mu m$ $n'1 = -1$ $v2 = 60$ $f2 = 8.333\ \mu m$ $n'2 = 1.6$ $fT = 7.14\ \mu m$

A numerical example of the embodiment in FIG. 4 will be described below.

$v1 = -20$ $f1 = -10\ mm$ $n'1 = -2$ $v2 = 50$ $f2 = -4\ mm$ $n'2 = 1.52$ $fT = -2.857\ mm$

Figure 7:
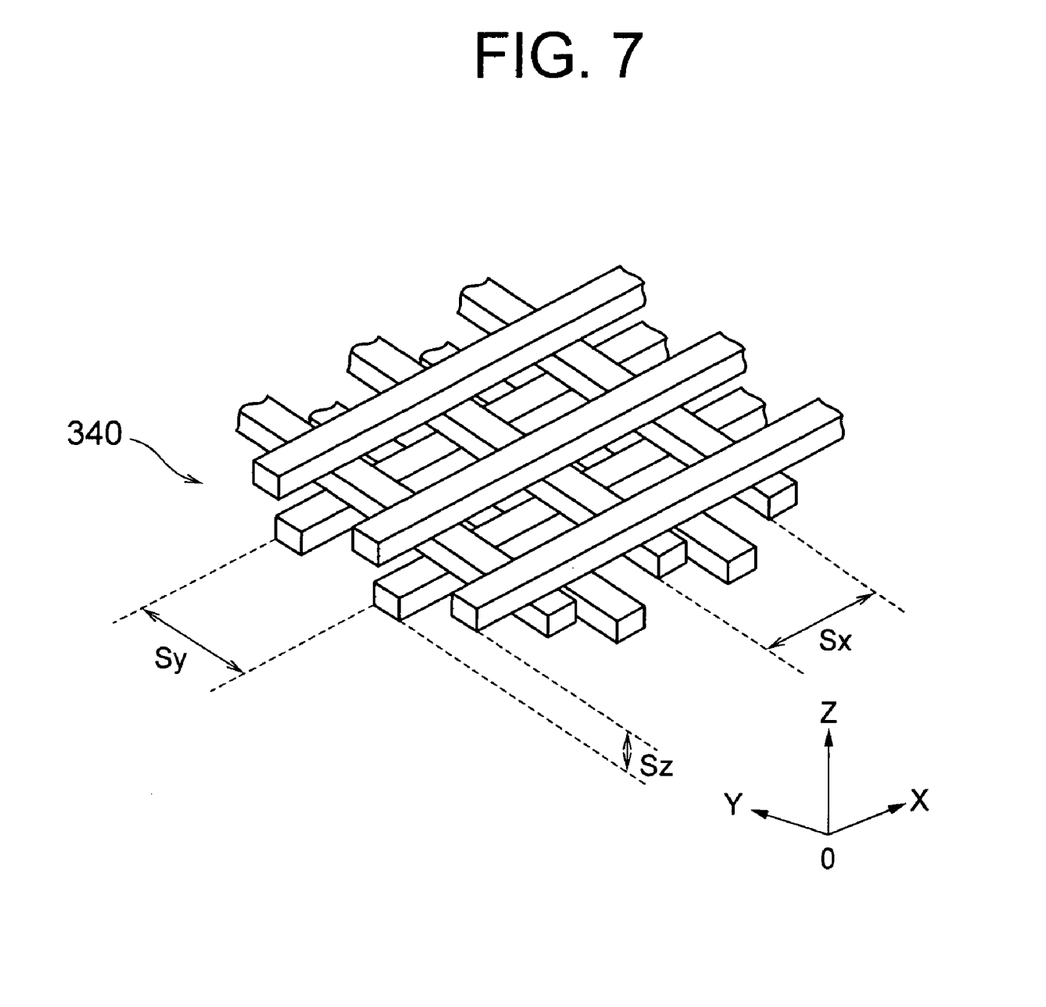
FIG. 7 is a diagram showing a first concrete example of a photonic crystal 340.
Figure 8:
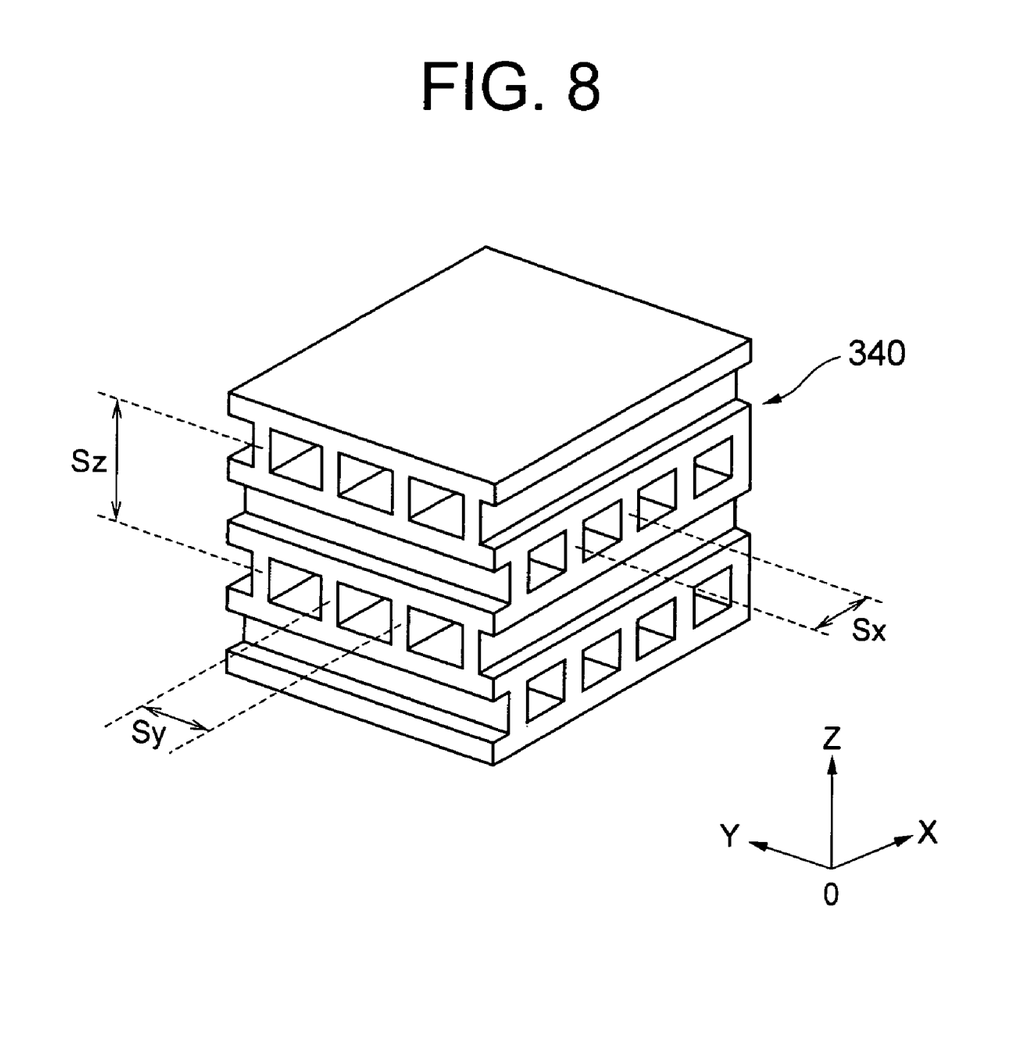
FIG. 8 is a diagram showing a second concrete example of the photonic crystal 340.

Comment which can be made commonly for the present invention will be described below. A photonic crystal is a concrete example of a medium of the negative refractive index medium. FIG. 7 shows a first concrete example of a photonic crystal 340, and FIG. 8 is a second concrete example of the photonic crystal 340. As shown in FIG. 7 and FIG. 8, the photonic crystal 340 is made of a medium having a periodic structure in a range of about $\lambda$ to several tenths of $\lambda$, by a method such as a lithography. The material used for making the photonic crystal is a dielectric material such as $SiO_2$, $TiO_2$, a synthetic resin such as acrylic, polycarbonate, and GaAs. Here, $\lambda$ is a wavelength of light which is used. In the diagram, a value of repeated periods Sx, Sy, and Sz in X, Y, and Z directions is in a range of $\lambda$ to several tenths of $\lambda$. It has been known that it is possible to realize the negative refractive index near a edge of a photonic band of the photonic crystal (refer to the Literature "Physical Review B, Volume 62, Page 10696 (2000)" by M. Notomi). It is preferable that the Z direction in the diagram is let to be an optical axis of the optical system.

A Z axis is a direction of an axis for which a rotational symmetry of the photonic crystal is optimum.

It is desirable that Sx, Sy, and Sz satisfy one of the following expressions (5-1), (5-2), and (5-3).

$$\lambda/10 < Sx < \lambda \qquad \text{expression (5-1)}$$

$$\lambda/10 < Sy < \lambda \qquad \text{expression (5-2)}$$

$$\lambda/10 < Sz < \lambda \qquad \text{expression (5-3)}$$

When values of Sx, Sy, and Sz exceed an upper limit or a lower limit, it does not function as a photonic crystal.

According to an application, one of the following expressions (5-4), (5-5), and (5-6) may be satisfied.

$$\lambda/30 < Sx < 4\lambda \qquad \text{expression (5-4)}$$

$$\lambda/30 < Sy < 4\lambda \qquad \text{expression (5-5)}$$

$$\lambda/30 < Sz < 4\lambda \qquad \text{expression (5-6)}$$

Regarding the negative refractive index material, when a relative dielectric constant $\in$ of the medium is negative, and also a relative permeability $\mu$ of the medium is negative, it has been known that the refractive index of the medium becomes $$-\sqrt{\in \mu}$$

Moreover, as the negative refractive index medium, a medium exhibiting negative refraction, a medium exhibiting approximately negative refraction such as thin films of silver, gold and copper, a medium exhibiting negative refraction in a specific direction of polarization, a medium having a chiral structure, and a medium having either the dielectric constant $\in$ or the permeability $\mu$ negative such as −1, may be used.

Moreover, sometimes the negative refractive index medium is also called as a left handed material. In this patent application, media including all of these negative refractive index medium, left handed material, the medium exhibiting approximately negative refraction, the medium exhibiting negative refraction in the specific direction of polarization, the medium having the spiral structure, and the medium having either the dielectric constant $\in$ or the permeability $\mu$ negative, are called as the medium exhibiting negative refraction. A medium exhibiting perfect imaging is also included in the media exhibiting negative refraction. Moreover, in a case of the medium having either the dielectric constant $\in$ or the permeability $\mu$ negative, the following expressions (5-6-1) and (5-6-2) in which $\in'$ and $\mu'$ are defined, may be satisfied.

$$\in' = \in/\in c \qquad \text{expression (5-6-1)}$$

$$\mu' = \mu/\mu c \qquad \text{expression (5-6-2)}$$

where $\in c$ is a dielectric constant of the material around the lens, and $\mu c$ is a permeability of the material around the lens.

In this case, the following expression (5-7) may be satisfied.

$$-2 \leq \in' \leq -0.5 \qquad \text{expression (5-7)}$$

According to an application, the following expression (5-8) may also be satisfied.

$$-8.0 \leq \in' \leq -0.2 \qquad \text{expression (5-8)}$$

In a case of a medium for which the magnetic permeability is almost −1, $\in'$ in expression (5-7) and expression (5-8), may be replaced by $\mu'$. Moreover, when a term "perfect imaging" is used in this patent application, a case in which 100% perfect imaging is not performed is also included. For example, a case in which a spatial frequency several times higher than a standard spatial frequency which is determined by the diffraction limit can be resolved is also included in the perfect imaging. Further, a case in which a spatial frequency increased several tens of percent of the standard spatial frequency which is determined by the diffraction limit can be resolved is also included in the perfect imaging.

Moreover, a shape of the lens may not be a shape of a normal three-dimensional lens, and a two-dimensional lens may also be used. In other words, a cylindrical lens may also be used. Furthermore, various shapes of a lens surface such as a spherical surface, an aspheric surface, an anamorphic surface, and a free-formed surface are applicable. In a case of the anamorphic surface and the free-formed surface, the elimination of the curvature of field with respect to a focal length which is determined by a local curvature may be taken into consideration.

As a wavelength of light used, a light source of a continuous spectrum, a white light source, a sum of monochromatic lights, a low coherence light source such as a super luminescent diode, a gas laser, and a semiconductor laser may be used.

As the wavelength of light used, from a point of view of an ability to transmit through air, and an easiness of procurement of the light source, a range of 0.1 μm to 3 μm may be used. A visible wavelength may be used as it is easy to use the visible wavelength. Electromagnetic waves such as the microwaves and the terahertz waves may be used. Infra-red light and ultra-violet light may be used.

The wavelength of 0.6 μm or less is even better, since a resolution can be improved easily for this wavelength.

A comment which can be made commonly for the embodiment of this patent application is that the surrounding of the negative refractive index medium 301 or 302 may be let to be a vacuum, water, oil, and a synthetic resin such as acrylic.

When the surrounding of the negative refractive index medium 301 or 302 is vacuum, it is possible to use vacuum-ultraviolet light, and there is no decline in the resolution due to a fluctuation of air. Therefore, a favorable imaging property is achieved. Letting the surrounding to be air is favorable as it is easy to make an optical apparatus, and the handling becomes easy. In an optical apparatus, only an optical path around the negative refractive index lens 301 or 302 may be let to be a vacuum, and the remaining part of the optical apparatus may be disposed in air.

It is possible to achieve an optical apparatus which is easy to handle, and have a favorable image forming capability.

A refractive index of air with respect to vacuum is let to be nA. The refractive index of air nA at an atmospheric pressure 1 (bar), when the wavelength is 500 nm, is nA=1.0002818.

A thickness of a lens formed of the negative refractive index medium is let to be t'. The thickness t' will be described below. The thickness t' may be such that the following expression (15-2) is satisfied.

$$0.1 \text{ mm} \leq t' \leq 300 \text{ mm} \qquad \text{expression (15-2)}$$

When a value of t' exceeds an upper limit, the size of the optical apparatus is increased, and the manufacturing becomes difficult.

According to the product, the value of thickness t' shown by the following expression (16-2) is acceptable.

$$0.01 \text{ mm} \leq t' \leq 300 \text{ mm} \quad \text{expression (16-2)}$$

According to the application, the value of thickness t' shown by the following expression (17) is also acceptable.

$$1100 \text{ nm} \leq t' \leq 200 \text{ mm} \quad \text{expression (17)}$$

Or, when the light is absorbed in the negative refractive index medium 301, the value of thickness t' shown by the following expression (18) is also acceptable.

$$30 \text{ nm} \leq t' \leq 50 \text{ mm} \quad \text{expression (18)}$$

Moreover, when expression 15-2 or expression 16-2 are satisfied, since a mechanical strength of the negative refractive index medium as an optical element is enhanced, handling during assembling of the optical apparatus becomes easy.

Or it is favorable since there is a possibility that a substrate or a lens forming the negative refractive index medium becomes unnecessary.

An upper limit value of t' in expressions (17) and (18) may be let to be 0.01 mm. With 0.01 mm as the upper limit value of t', it may be possible to manufacture the negative refractive index material as a thin film by a method such as a vapor deposition or a sputtering.

Manufacturing the photonic crystal by a self-cloning method can be taken into consideration (refer to Literature "Optronics, July, 2001 issue, Page 197" by Sato and Kawakami).

It is possible to use the lens system of this patent application for various types of optical apparatuses.

Finally, definitions of technical terms used in these embodiments will be made below.

An optical apparatus means an apparatus which includes an optical system or an optical element. The optical apparatus may not function singly. In other words, it may be a part of an apparatus.

Optical apparatuses include apparatuses such as an imaging apparatus, an observing apparatus, a display apparatus, an illuminating apparatus, a signal processing apparatus, an optical information processing apparatus, a projection apparatus, a projection and exposing apparatus.

Examples of the imaging apparatus are a film camera, a digital camera, a digital camera for PDA (personal digital assistance), a robot eye, an interchangeable-lens digital single-lens reflex camera, a TV (television) camera, a video recording apparatus, an electronic video recording apparatus, a camcorder, a VTR (video tape recording) camera, a digital camera of a mobile telephone, a TV camera of a mobile telephone, an electronic endoscope, a capsule endoscope, a car-mounted camera, a camera of an artificial satellite, a camera of a planetary probe, a camera of a space probe, a camera of a monitoring device, eye of various sensors, a digital camera of a sound recording apparatus, an artificial sight, a laser scanning microscope, a projection and exposing apparatus, a stepper, an aligner, an optical probe microscope, and a near-field microscope. The digital camera, a card-shaped camera, the TV camera, the VTR camera, the video recording camera, the digital camera of the mobile telephone, the TV camera of the mobile telephone, the car-mounted camera, the camera of the artificial satellite, the camera of the planetary probe, the camera of the space probe, the digital camera of the sound recording apparatus are examples of the electronic imaging apparatus.

Examples of the observing apparatus are a microscope, a telescope, spectacles, binoculars, loupe (magnifying lens), a fiber scope, a finder, a view finder, contact lenses, an intraocular lens, and the artificial sight.

Examples of the display apparatus are a liquid crystal display, the view finder, a game machine (PLAY STATION manufactured by SONY Corporation), a video projector, a liquid crystal projector, a head-mounted display, a PDA (personal digital assistance) (portable information terminal), the mobile telephone, and the artificial sight.

Example of the projection apparatus are the video projector and the liquid crystal projector.

Examples of the illuminating apparatus are a strobe of a camera, a head light of an automobile, a light source of an endoscope, and a light source of a microscope.

Examples of the signal processing apparatus are the mobile telephone, a personal computer, the game machine, a reading and writing apparatus of an optical disc, a computing unit (arithmetic unit) of an optical computer, an optical interconnection apparatus, an optical information processing apparatus, an optical LSI (large scale integration), an optical computer, and a PDA (personal digital assistance).

An information transmitting apparatus means an apparatus to which some sort of information can be input, and which can transmit this information. The information may be input from the mobile telephone, a fixed-line (land line) telephone, a remote control of the game machine, a television, a radio-cassette player (recorder), a stereo, the personal computer, and a keyboard, a mouse, and a touch panel of the personal computer.

It also includes a display, a monitor of the personal computer, and a television monitor with the imaging device.

The information transmitting apparatus is included in the signal processing apparatus.

The imaging device means a CCD (charge coupled device), a solid imaging device, and a photographic film. Moreover, the plane-parallel plate is let to be included in one prism. A change in a viewer is let to include change in visibility. A change in an object is let to include a change in an object distance, a movement of the object, a motion and vibration of the object, and a blurring of the object. The imaging device, a wafer, an optical disc, and a silver salt film are examples of an image forming member.

A definition of an extended curved surface is as follows.

The extended curved surface may have any shape apart from a shape of a spherical surface, a flat surface, a rotationally symmetrical aspheric surface, a spherical surface which is eccentric with respect to an optical axis, a flat surface, the rotationally symmetrical aspheric surface, or an aspheric surface having a symmetrical surface, an aspheric surface having only one symmetrical surface, an aspheric surface having no symmetrical surface, a free-form surface, and a surface having a point and a line which are not differentiable. It may be any surface such as a reflecting surface and a refracting surface, which have some effect on light.

In the present invention, all these surfaces are generically called as an extended curved surface.

An image forming optical system indicates an optical system such as an imaging optical system, an observing optical system, a projection optical system, the projection and exposing optical system, a display optical system, and a signal processing optical system.

A lens for imaging, of the digital camera is an example of the imaging optical system.

A microscope optical system and a telescope optical system are examples of the observing optical system.

An optical system of the video projector, an optical system for lithography, a reading and writing optical system of an optical disc, and an optical system of an optical pick-up are examples of the projection optical system.

The optical system for lithography is an example of the projection and exposing optical system.

An optical system of the view finder of the video camera is an example of the display optical system.

A reading and writing optical system and the optical system of the optical pick-up are examples of the signal processing optical system.

The optical element indicates a lens, an aspheric lens, a mirror, a prism, a free-form surface prism, a diffraction optical grating (DOE), and a heterogeneous lens. The plane-parallel plate is also an example of the optical element.

According to the present invention, there is shown an effect that it is possible to provide a lens system, in which a negative refractive index medium is used, and the chromatic aberration is reduced.

The present invention includes the following various characteristics.

(Note)

10. A lens system comprising:
a first lens which is formed of a medium exhibiting negative refraction; and
a second lens apart from the first lens, wherein
a sign of Abbe's number for a material which forms the first lens differs from a sign of Abbe's number for a material which forms the second lens.

20. A lens system comprising:
a first lens which is formed of a medium exhibiting negative refraction; and
a second lens which is formed of a medium having a positive refractive index, wherein
a sign of Abbe's number for a material which forms the first lens differs from a sign of Abbe's number for a material which forms the second lens.

30. A lens system comprising:
a first lens which is formed of a medium exhibiting negative refraction; and
a second lens which is formed of a medium exhibiting a negative refractive index, wherein
a sign of Abbe's number for a material which forms the first lens differs from a sign of Abbe's number for a material which forms the second lens.

40. A lens system comprising:
a first lens which is formed of a medium having a positive refractive index; and
a second lens which is formed of a medium having a positive refractive index, wherein
a sign of Abbe's number for a material which forms the first lens differs from a sign of Abbe's number for a material which forms the second lens.

50. The lens system according to one of Nos. 10 to 40, wherein a sign of a focal length of the first lens is same as a sign of a focal length of the second lens.

52. The lens system according to one of Nos. 10 to 50, which includes the first lens and the second lens.

54. The lens system according to one of Nos. 10 to 52, for which the expression 123 is satisfied.

60. A lens system comprising:
a first lens which is formed of a medium exhibiting negative refraction; and
a second lens apart from the first lens, wherein
a sign of Abbe's number for a material which forms the first lens is same as a sign of Abbe's number for a material which forms the second lens.

70. A lens system comprising:
a first lens which is formed of a medium exhibiting negative refraction; and
a second lens which is formed of a medium having a positive refractive index, wherein
a sign of Abbe's number for a material which forms the first lens is same as a sign of Abbe's number for a material which forms the second lens.

80. A lens system comprising:
a first lens which is formed of a medium exhibiting negative refraction; and
a second lens formed of a medium exhibiting a negative refraction, wherein
a sign of Abbe's number for a material which forms the first lens is same as a sign of Abbe's number of a material which forms the second lens.

100. The lens system according to one of Nos. 60 to 80, wherein a sign of a focal length of the first lens differs from a sign of the focal length of the second length.

102. The lens system according to one of Nos. 60 to 100, which includes the first lens and the second lens.

104. The lens system according to one of Nos. 60 to 102, for which an expression 123 is satisfied.

110. An optical apparatus comprising:
the lens system according to one of Nos. 10 to 104.

111. A microscope comprising:
the lens system according to one of Nos. 10 to 104.

112. An optical disc apparatus comprising:
the lens system according to one of Nos. 10 to 104.

113. An observation apparatus comprising:
the lens system according to one of Nos. 10 to 104.

114. An imaging apparatus comprising:
an imaging device in addition to the lens system according to one of Nos. 10 to 104.

115. A projection apparatus comprising:
the lens system according to one of Nos. 10 to 104.

120. The lens system or the apparatus according to one of Nos. 10 to 115, wherein
the medium exhibiting the negative refraction is a negative refractive index medium.

125. The lens system or the apparatus according to one of Nos. 10 to 115, wherein
the medium exhibiting the negative refraction is a medium which exhibits properties of perfect imaging.

130. The lens system or the apparatus according to one of Nos. 10 to 115, wherein
the medium exhibiting the negative refraction is a photonic crystal.

130-2. The lens system or the apparatus according to claim 130, wherein the photonic crystal is used as the medium exhibiting negative refraction, and an axis of the photonic crystal for which a rotational symmetry is optimum is directed toward an optical axis of the optical system.

131. The lens system or the apparatus according to one of Nos. 10 to 115, wherein the medium exhibiting negative refraction satisfies expressions 5-8.

132. The lens system or the apparatus according to one of Nos. 10 to 131, wherein a refractive index of the material exhibiting negative refraction satisfies expression 142.

133. The lens system or the apparatus according to one of Nos. 10 to 132, wherein Abbe's number for the medium exhibiting negative refraction satisfies expression 147.

What is claimed is:

1. A lens system comprising:
  a first lens which is formed of a medium exhibiting negative refraction; and
  a second lens, wherein
  a sign of Abbe's number for a material which forms the first lens differs from a sign of Abbe's number for a material which forms the second lens so that an aberration occurring in the medium exhibiting negative refraction is reduced in the lens system.

2. The lens system according to claim 1, wherein the second lens which is formed of a medium having a positive refractive index.

3. The lens system according to claim 1, wherein the second lens which is formed of a medium exhibiting negative refraction.

4. A lens system comprising:
  a first lens which is formed of a medium exhibiting negative refraction; and
  a second lens, wherein
  a sign of Abbe's number for a material which forms the first lens is same as a sign of Abbe's number for a material which forms the second lens so that an aberration occurring in the medium exhibiting negative refraction is reduced in the lens system;
  wherein the following expression 123 is satisfied:

$$-\left|\frac{10}{f_{TN}}\right| \leq \sum_{i=1}^{N} \frac{1}{fi \cdot vi} \leq \left|\frac{10}{f_{TN}}\right| \qquad \text{expression 123}$$

where
  fi is a focal length of an i'th lens,
  vi is Abbe's number for the i'th lens,
  fTN is a focal length of the entire lens system, and
  N is the number of lenses.

5. The lens system according to claim 4,
  the second lens which is formed of a medium having a positive refractive index.

6. The lens system according to claim 4, wherein the second lens which is formed of a medium exhibiting negative refraction.

7. The lens system according to one of claims 1 to 3, wherein a sign of a focal length of the first lens is same as a sign of a focal length of the second lens.

8. The lens system according to claim 7, which includes the first lens and the second lens.

9. The lens system according to one of claims 1 to 3, wherein an following expression 123 is satisfied:

$$-\left|\frac{10}{f_{TN}}\right| \leq \sum_{i=1}^{N} \frac{1}{fi \cdot vi} \leq \left|\frac{10}{f_{TN}}\right| \qquad \text{expression 123}$$

where
  fi is a focal length of an i'th lens,
  vi is Abbe's number for the i'th lens,
  fTN is a focal length of the entire lens system, and
  N is the number of lenses.

10. An optical apparatus comprising:
  the lens system according to one of claims 1 to 6.

11. The lens system according to one of claims 1 to 6, wherein
  the medium exhibiting the negative refraction is a negative refractive index medium.

12. The lens system according to one of claims 1 to 6, wherein
  the medium exhibiting the negative refraction is a medium which exhibits properties of perfect imaging.

13. The lens system according to one of claims 1 to 6, wherein
  the medium exhibiting the negative refraction is a photonic crystal.

14. The lens system according to claim 13, wherein the photonic crystal is used as the medium exhibiting negative refraction, and an axis of the photonic crystal for which a rotational symmetry is optimum is directed toward an optical axis of the optical system.

15. The lens system according to one of claims 1 to 6, wherein the medium exhibiting negative refraction satisfies following expression 5-8:

$$-8.0 \leq \epsilon' \leq -0.2 \qquad \text{expression (5-8)}$$

where
  $\epsilon' = \epsilon/\epsilon_c$
  $\epsilon$ is a dielectric constant of the medium of the lens, and $\epsilon_c$ is a dielectric constant of the medium around the lens.

16. The lens system according to one of claims 1 to 6, wherein a refractive index of the material exhibiting negative refraction satisfies following expression 142:

$$-10 \leq ns \leq -0.1 \qquad \text{expression 142}$$

where ns is a refractive index of the negative refractive index medium for vacuum.

17. The lens system according to one of claims 1 to 6, wherein Abbe's number for the medium exhibiting negative refraction satisfies following expression 147:

$$0.01 \leq |v| \leq 10000 \qquad \text{expression 147}$$

where v is Abbe's number for the medium exhibiting negative refraction.

* * * * *